April 29, 1952  K. T. LEHMANN  2,594,661
FISH IMPALING PIN
Filed July 15, 1949
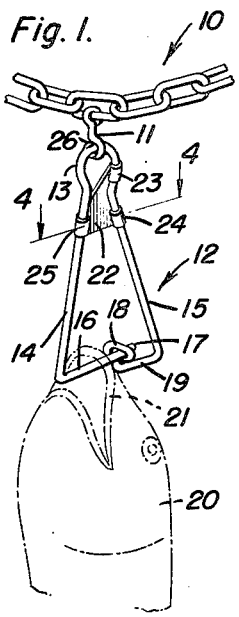
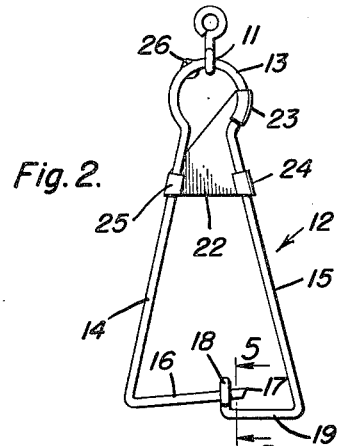
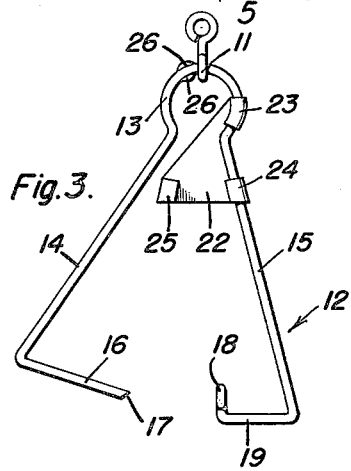
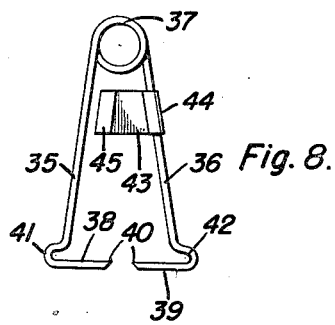
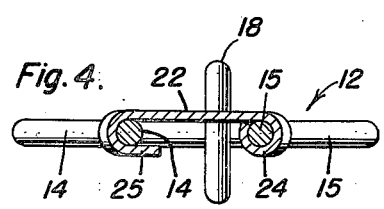
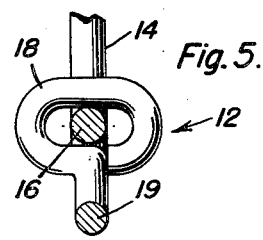
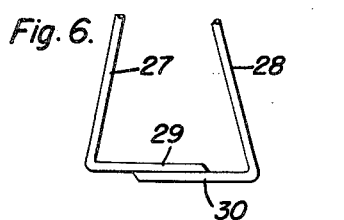
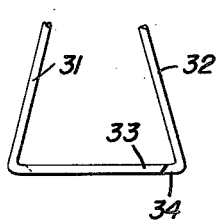
Karl T. Lehmann
INVENTOR.
BY Clarence A. O'Brien
and Harvey B. Jackson
Attorneys Patented Apr. 29, 1952

2,594,661

UNITED STATES PATENT OFFICE 2,594,661

FISH IMPALING PIN

Karl T. Lehmann, St. Charles, Mo.

Application July 15, 1949, Serial No. 105,018

1 Claim. (Cl. 24—159)

The present invention relates to certain new and useful improvements in fish stringers and has more particular reference to the style or type of stringer which comprises a flexible chain or equipment element which is adapted to be anchored on a wharf, the gunwale of a boat, or other support and which has individual snap-fasteners attached thereto at longitudinally spaced points, one fastener for each fish, in order that the fish may be attached, one at a time, as they are caught, and then suspended overboard in the water in a well-known manner.

As the foregoing opening statement of the invention reveals, I am aware that patents have been granted on stringers equipped with so-called snap-fasteners and grippers which are individually strung at longitudinally spaced points on the above mentioned chain and that it is common technique to pierce the lips of the mouth of the fish in order to make the attachment of same to the chain and to avoid passing the chain through the mouth and between the gills, as is common practice. It is difficult with most fasteners to quickly and easily pierce the lips and, for such reason, an object of the invention is to provide a fastener having coacting members which may be caused to penetrate the lips of a fish and then securely clasped together to minimize the likelihood of the fish dislodging itself from the fastener.

More specifically, the object of the invention is to provide a simple, economical, practical and highly efficient fish fastener for a stringer chain or cord which has the aforementioned properties and which is such in character and construction that it will fulfill the needs and meet all expected requirements of the average user.

In carrying out the preferred embodiment of the invention, I provide a fastener with penetrating members, said members being on opposed limbs which are springable toward and from each other and which may be sprung apart to detach the fish and squeezed or forced together to penetrate and fasten the fish in place.

Other objects and advantages will become more readily apparent from the following description and the accompanying illustrative drawing.

In the drawings:

Figure 1 is a perspective view showing a fragmentary portion of a stringer chain, showing one of my improved fasteners and also showing the manner in which a fish is snapped and held in position thereon.

Figure 2 is an enlarged side elevation of the fastener detached from the chain and with the fish removed.

Figure 3 is a view in elevation based on Figure 2 and showing the limbs sprung to normal open positions.

Figure 4 is a horizontal section on the line 4—4 of Figure 1, looking in the direction of the arrows.

Figure 5 is an enlarged fragmentary detail section on the line 5—5 of Figure 2, looking in the direction of the arrows.

Figures 6 and 7 are views of modifications in construction.

Figure 8 is an elevational view showing a further modification.

By way of introduction to the detailed description, it will be noted that the chain attached fish fastener is the same in Figures 1, 2, 3, 4 and 5. Figures 6, 7 and 8 are modifications and the description will be prepared accordingly.

Reference being had to Figs. 1 to 5, inclusive, the stringer chain is denoted by the numeral 10 in Fig. 1 and is elsewhere omitted. The chain is provided at spaced points with suitable links 11 (one shown) which are employed to connect the fish fasteners to the chain. Each fish fastener is the same in construction and each is denoted by the numeral 12. The fastener is fashioned and formed from a single length of wire rod of an appropriate gauge and the material used is of the requisite degree of resiliency. The length of wire is bent intermediate its ends to form an expansible and contractible spring coil 13 and a pair of opposed complemental duplicate limbs 14 and 15 respectively. The terminal or free end portion of limb 14 is bent laterally as at 16 to provide a keeper as well as a pointed penetrating prong 17 which latter is adapted to be releasably connected with a keeper loop 18 on the lateral or inturned end 19 of the limb 15.

The inherent resiliency of the limbs is such as to normally spread the limbs apart into the "open" relationship shown in Figure 3. In the latter position, the parts are in readiness to be readily attached to the fish 20. This is done by passing the pointed prong 17 of the detent 16 through the lip or lips 21 of the fish and then securing said prong in the keeper loop 18. To maintain the limbs in "closed" position, I provide a special clasp. This is in the form of a suitably proportioned and shaped metal or equivalent plate 22 having bent tabs or spaced rolled edges forming fastening sleeves 23 and 24 on one edge portion rigidly attached to the limb 15 and coil 13 respectively. It will be noticed that the sleeve 24 is straight and axially aligned with the limb 15 while the other sleeve 23 is not only curved to fit the coil, but is offset and therefore not in line with the sleeve 24. This arrangement prevents the plate 22 from either twisting or turning relative to limb 15. It stays put and provides a constantly positioned clasp and avoids the annoyance of having to cope with a clasp which flaps aimlessly about and gets out of position. The over-all plate is generally triangular in plan and provides an oblique edge spanning the space between the limbs 14 and 15. The lower corner portion (at the left in Figure 2) is fashioned into a hook or catch 25 which constitutes a suitable holder for the relatively movable limb 14. The limb 14 is shown engaged with the catch in Figure 2 and is shown disengaged therefrom in Figure 3. It will be evident, therefore, that the pointed prong 16 is in readiness to penetrate and attach the fish in Figure 3 and, by properly lining up the parts 14 to 19, inclusive, the prong may be caused to pierce the lip after which it is secured in the keeper loop, and about the same time the limb 14 will snap behind and lodge itself in the catch 25. Consequently, by employing a suitable "squeeze" action, the fish may be readily secured to the fastener. I might mention, as an incidental factor, that the aforementioned spring or coil 13 has suitable nodules 26 thereon to prevent the left-hand side of the fastener from slipping through the link 11 and thus becoming displaced. This might happen if the parts were in the position shown in Figure 3, for it would then be quite possible for the fastener to "angle itself" in relation to the link and chain to become accidentally displaced. I have taken into consideration all requisite features and requirements as I understand same and believe that I have evolved and produced a simple, economical and feasible fish fastener for satisfactory application to a stringer chain.

In Figure 6, the diverging spring limbs are denoted by the numerals 27 and 28 and have laterally bent terminal end portions 29 and 30 with their terminals suitably sharpened and disposed in overlapping (one on top of the other) relationship.

The same idea is seen in Figure 7 wherein the limbs 31 and 32 carry pointed end portions 33 and 34 which are in side-by-side relationship.

In the modification seen in Figure 8, the spring wire frame also embodies diverging opposed substantially duplicate limbs 35 and 36 connected at corresponding ends by a spring coil 37 and having inturned terminals 38 and 39 with pointed extremities 40. The principal distinction in the limb construction has to do with the formation of reinforcing bends 41 and 42 which may be used as retaining elements and lodged in the mouth of a fish to hold the mouth open, if desired, to facilitate removing a fish-hook from the mouth. In this arrangement, I have shown a simple plate 43 rigidly connected at one end, as at 44, to the limb 36 and having a hook-like catch 45 at the opposite end for releasable connection of the spring limb 35. This plate 43 differs slightly from the plate 22 but the main feature has to do with the bends 41 and 42 serving as means to spread the mouth of the fish open in the manner stated.

Novelty is predicated, generically speaking, on a single length of wire of resilient character bent into V-shaped frame with a coil or bend at the apex end and with inturned members at the opposite or basal ends adapted to penetrate the mouth of the fish to facilitate attachment of the fish to the frame and to allow the fish, through the medium of the frame, to be attached to the chain. The opening and closing steps and possible single handed operation of the fastener makes its adoption and use highly desirable.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

As a new article of manufacture, a snap-fastener for attachment to a fish comprising a substantially triangular spring wire frame having a pair of duplicate limbs converging and joined together at corresponding ends by way of a spring coil, the diverging ends of said limbs being provided with complemental lateral bends directed toward each other, and a clasp embodying a flat plate provided along one marginal edge with longitudinally spaced individual sleeves, one sleeve embracing an adjacent limb, the other sleeve embracing an adjacent portion of said coil, one corner portion of said plate having a catch for reception and retention of an intermediate portion of the other limb.

KARL T. LEHMANN.

REFERENCES CITED

The following references are of record in the file of this patent:

UNITED STATES PATENTS

| Number | Name | Date |
|---|---|---|
| 590,401 | Morgan | Sept. 21, 1897 |
| 1,025,783 | Bryant | May 7, 1912 |
| 1,407,221 | Reimers | Feb. 21, 1922 |
| 1,713,779 | Overton | May 21, 1929 |
| 1,975,754 | Pflueger | Oct. 2, 1934 |
| 2,226,402 | Hischmann | Dec. 24, 1940 |
| 2,297,623 | Hickman | Sept. 29, 1942 |
| 2,427,715 | Cooper | Sept. 23, 1947 |